United States Patent
Frana-Guthrie et al.

(10) Patent No.: US 6,817,404 B2
(45) Date of Patent: Nov. 16, 2004

(54) COOLING PACKAGE FOR AGRICULTURAL COMBINE

(75) Inventors: Rebecca Ann Frana-Guthrie, Coal Valley, IL (US); Alan David Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 153 days.

(21) Appl. No.: 10/053,514

(22) Filed: Oct. 25, 2001

(65) Prior Publication Data

US 2003/0079858 A1 May 1, 2003

(51) Int. Cl.⁷ .............................. B60K 11/04; B60H 3/00
(52) U.S. Cl. ........................ 165/43; 165/67; 180/68.1; 180/68.4; 29/890.03
(58) Field of Search ............................. 165/41, 42, 43, 165/67, 140; 180/68.1, 68.2, 68.4; 123/41.01; 29/890.03

(56) References Cited

U.S. PATENT DOCUMENTS

| | | | |
|---|---|---|---|
| 4,059,080 A | * 11/1977 | Rudert | |
| 4,474,162 A | * 10/1984 | Mason | 165/149 X |
| 4,531,574 A | * 7/1985 | Hoch | 165/67 |
| 4,619,313 A | * 10/1986 | Rhodes et al. | 165/67 |
| 4,651,816 A | * 3/1987 | Struss et al. | 180/68.4 X |
| 4,706,461 A | * 11/1987 | Pratt et al. | |
| 4,736,727 A | 4/1988 | Williams | |
| 4,916,902 A | 4/1990 | Pratt | |
| 4,997,033 A | * 3/1991 | Ghiani et al. | 165/67 |
| 5,002,019 A | * 3/1991 | Klaucke et al. | 29/890.03 X |
| 5,097,891 A | * 3/1992 | Christensen | 165/41 |
| 5,219,016 A | * 6/1993 | Bolton et al. | 165/41 |
| 5,267,624 A | * 12/1993 | Christensen | 180/68.2 |
| 5,316,079 A | * 5/1994 | Hedeen | 165/67 X |
| 5,360,059 A | * 11/1994 | Olson | 165/67 X |
| 5,372,184 A | * 12/1994 | Joseph et al. | 165/67 |
| 5,474,498 A | 12/1995 | Rauckman | |
| 5,660,149 A | * 8/1997 | Lakerdas et al. | 123/41.01 X |
| 5,671,803 A | * 9/1997 | Tepas et al. | 165/67 X |
| 5,794,689 A | * 8/1998 | Ghiani | 165/140 |
| 6,029,345 A | * 2/2000 | Christensen | 165/67 X |
| 6,059,019 A | * 5/2000 | Brost et al. | 165/67 |
| 6,105,660 A | * 8/2000 | Knurr | 165/67 X |
| 6,129,056 A | * 10/2000 | Skeel et al. | 180/68.1 X |

(List continued on next page.)

FOREIGN PATENT DOCUMENTS

| | | |
|---|---|---|
| DE | 32 00 682 A1 * | 7/1983 |
| DE | 4244039 | 7/1994 |
| DE | 10018001 | 10/2001 |
| EP | 1 306 637 A1 * | 10/2002 |

OTHER PUBLICATIONS

John Deere (Europe) Drawing entitled "Radiator Compartment II Detailed Page Information" and Parts List (2 pages), date unknown, but believed prior to Oct. 25, 2001*.

European Patent Office, Search Report EP 02102474, Mar. 13, 2003, 3 pages.

*Primary Examiner*—L V Ciric
(74) *Attorney, Agent, or Firm*—Beem Patent Law Firm

(57) ABSTRACT

In a cooling package for use in an agricultural combine, a subassembly comprises a radiator and a charge air cooler, with a metal-to-metal seal between the radiator and the charge air cooler, thereby eliminating gaps and preventing air from bypassing cooling cores. A cooling package includes a frame having a flange, a subassembly of a radiator and a charge air cooler being sealingly mounted into the frame and against the flange. A method of manufacturing a cooling package comprises providing a frame having an inner flange, providing a radiator, providing a charge air cooler, connecting the radiator to the charge air cooler to form a subassembly, and mounting the subassembly into the frame to seal against the flange.

14 Claims, 4 Drawing Sheets

U.S. PATENT DOCUMENTS 6,142,213 A * 11/2000 Gallivan et al. ............... 165/41
6,298,906 B1   10/2001 Vize
6,318,454 B1 * 11/2001 Schule et al. ................ 165/140
6,386,273 B1 *  5/2002 Hateley ........................ 165/67
6,401,801 B1 *  6/2002 Dicke .......................... 165/41 X
6,427,766 B2 *  8/2002 Zobel et al. ............... 165/41 X
6,543,525 B2 *  4/2003 Kalbacher ................... 165/140
6,616,411 B2 *  9/2003 Sheidler et al.
6,634,418 B2 * 10/2003 Wooldridge ........... 180/68.1 X
2001/0054497 A1 * 12/2001 Kalbacher ................... 165/140
2002/0189786 A1 * 12/2002 Fisher et al. .................. 165/41

* cited by examiner

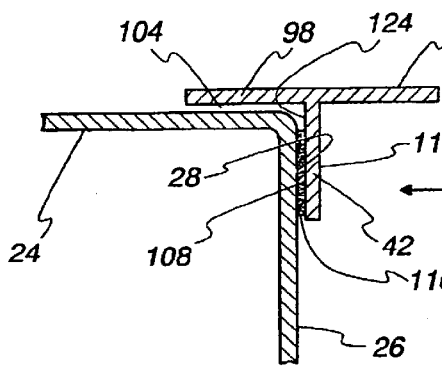
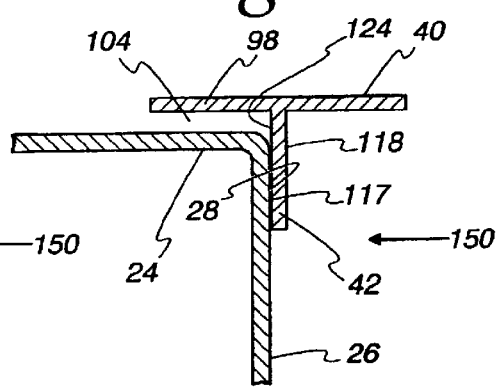
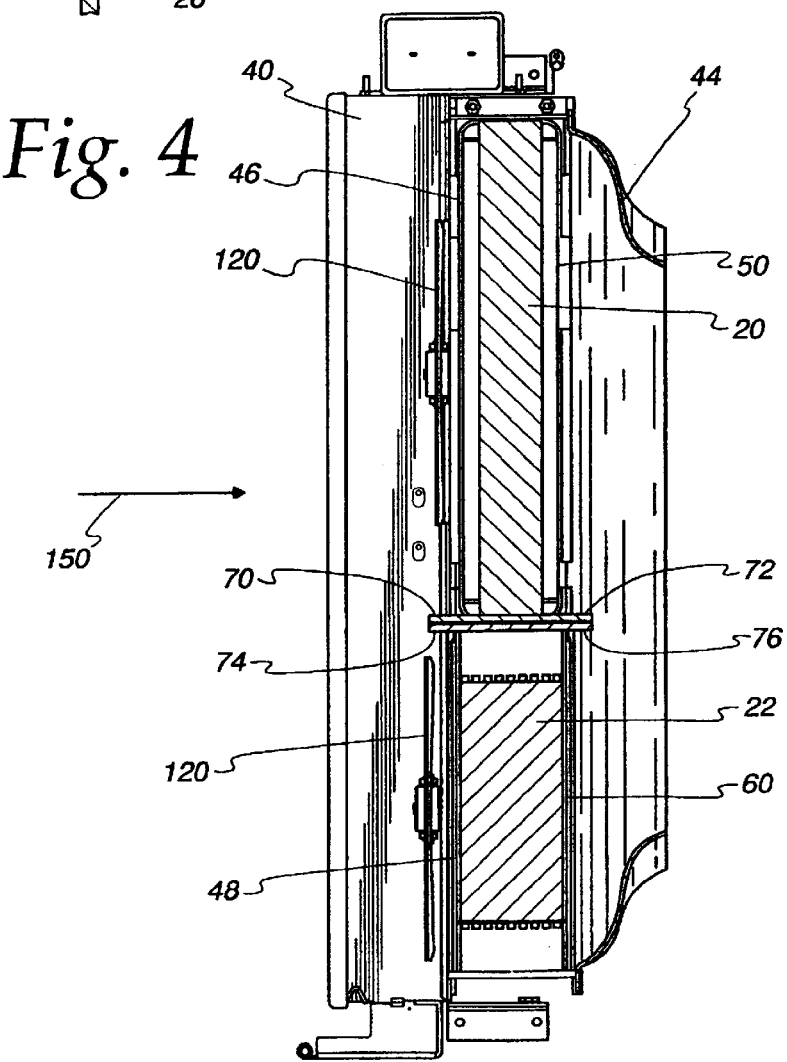

COOLING PACKAGE FOR AGRICULTURAL COMBINE

BACKGROUND OF THE INVENTION

1. Field of the Invention

The present invention is directed to a cooling package for use in an agricultural combine, more particularly it relates to sealing, mounting and connection of a radiator and charge air cooler in a cooling package.

2. Description of the Related Art

An agricultural combine often is powered by a turbocharged diesel engine requiring a cooling package which may include a radiator and a charge air cooler. In order to be adequately stocked to build cooling packages for combines, manufacturers have purchased radiators and charge air coolers and maintained inventories of these components. In assembling each cooling package, the manufacturer has mounted a radiator and a charge air cooler into a large frame. For ease of manufacture, the frame typically has been substantially larger than the combined dimensions of the components, resulting in physical gaps between components and gaps between each component and the frame. A problem with existing cooling packages is that there has not been a tight seal between the components themselves and there has not been a tight seal between each component and the frame. Instead of tight seals, there have been physical gaps between components and gaps between each component and the frame. Each gap is tantamount to an air leak path, permitting environmental air to bypass the cooling core of the radiator and the cooling core of the charge air cooler, thereby decreasing the efficiency of the cooling package and each of its components. The problem of gaps is exacerbated by fouling of the cooling cores caused by hot, dusty, chaff-laden conditions typical in the environment around agricultural harvest combines. As the cores become fouled through use, a larger proportion of the environmental air passes through the unintended and undesirable gaps which offer relatively less resistance to air flow than the fouled cores.

The cooling package circulates air from the environment through heat exchanger cores in the radiator and the charge air cooler. The radiator's purpose is to reject heat from an engine cooling fluid, usually a mixture of water and ethylene glycol, into the circulated environmental air to cool the engine and other moving parts. The charge air cooler's purpose is to improve the overall efficiency of the engine by improving the performance of a turbocharger within the engine. A turbocharger compresses air that is sent to cylinders of the engine, however, an undesired outcome of this compression is that the air is heated as it is compressed, sometimes to as hot as 250° C. Because hot air is less dense than cool air, it is advantageous to cool this air, allowing air to be fed to the cylinders at a more optimized air to fuel ratio. Cooling of this air is accomplished in the charge air cooler, where air temperature can be lowered from 250° C. to 80° C. or lower.

However, the environment of a combine poses an unusually severe problem as compared to other work machines. Any air that bypasses the cores of the radiator and charge air cooler is unavailable to cool the radiator fluid or the compressed air. This problem reduces the heat transfer efficiency of the radiator and charge air cooler which can lead to engine overheating or loss of power.

Previously on combines, the radiator and the charge air cooler have been placed into a cooling package frame so that gaps were formed between these components and between each component and the frame. Efforts have been made to stuff pieces of foam or other packing into these gaps in an attempt to prevent the passage of air, dust and chaff through the gaps. Foam has not been cut precisely for the cooling package, and irregular pieces have stuffed into the gaps of the cooling package. Foam as thick as one to two inches and as wide as 4 inches or more has been used. Either a worker installing the packing had to be unusually attentive and thorough, or the gaps were not completely filled. Thus, existing cooling packages have failed to seal the gaps formed between the components and between each component and the frame, and problems arose when packing wore away, fell out, decomposed due to heat, humidity or the formation of particulates, or if a leak path formed through the packing.

Efforts have been made to mount a radiator into a frame to create a seal around the outer perimeter of the radiator as shown in U.S. Pat. No. 6,298,906, but this does not address the problem of sealing a radiator and charge air cooler in combination.

Therefore, what is needed is a cooling package with a tight seal between the radiator and the charge air cooler, and a tight seal between each of these components and the frame of the cooling package, so that there are no gaps for the air to pass through.

BRIEF SUMMARY OF THE INVENTION

It is an object of the present invention to provide a cooling package for a combine, including a subassembly of a radiator and a charge air cooler, wherein the subassembly has a face with a perimeter.

It is another object of the present invention to form a seal between the radiator and the charge air cooler Another object of the invention is to form a seal around the perimeter of the face of the subassembly so that the air that passes into the cooling package will only be able to follow a path through the cores, not around the cores or through leak paths.

It is a feature of the present invention to provide a cooling package for a combine. The main components of the cooling package are a radiator and a charge air cooler, which are connected side by side creating a subassembly having a face with a perimeter. A subassembly seal is formed along the connected sides of the radiator and the charge air cooler. The subassembly seal is intended to eliminate leak paths between the radiator and the charge air cooler. The subassembly is mounted into an opening within a frame. The frame has an inwardly extending flange that the perimeter of the face of the subassembly is abutted against. The flange provides a perimeter seal around the perimeter of the subassembly face so that no leak paths exist around the subassembly.

In a preferred embodiment of the invention, the radiator and the charge air cooler have lips that extend from the sides to be connected. The lips are bolted together to form the subassembly seal between the sides of the radiator and the charge air cooler, which form the subassembly. In the preferred embodiment, foam tape is placed on the flange to ensure the formation of the perimeter seal around the subassembly face. The subassembly is bolted into the frame to form the cooling package.

BRIEF DESCRIPTION OF THE SEVERAL VIEWS OF THE DRAWINGS

FIG. 3 is cross-sectional view of the frame and the inwardly extending flange with the foam tape and the subassembly in place.

FIG. 4 is top cross-sectional view of the assembled cooling package.

FIG. 6 is a cross-sectional view of the frame and the inwardly extending flange with a metal to metal seal between the flange and the subassembly.

DETAILED DESCRIPTION OF THE INVENTION

Figure 1:
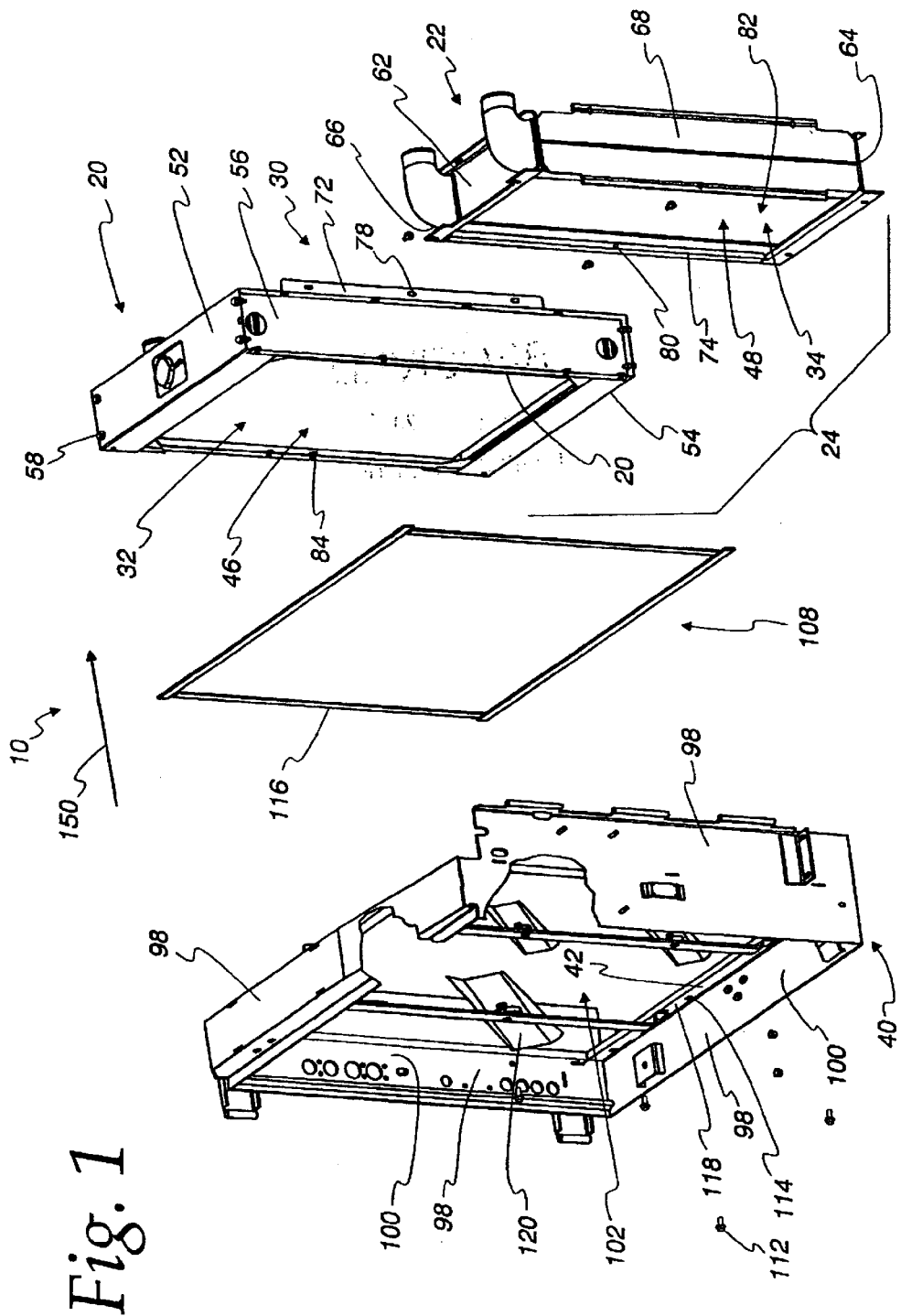
FIG. 1 is an exploded perspective view of the cooling package.
Figure 2:
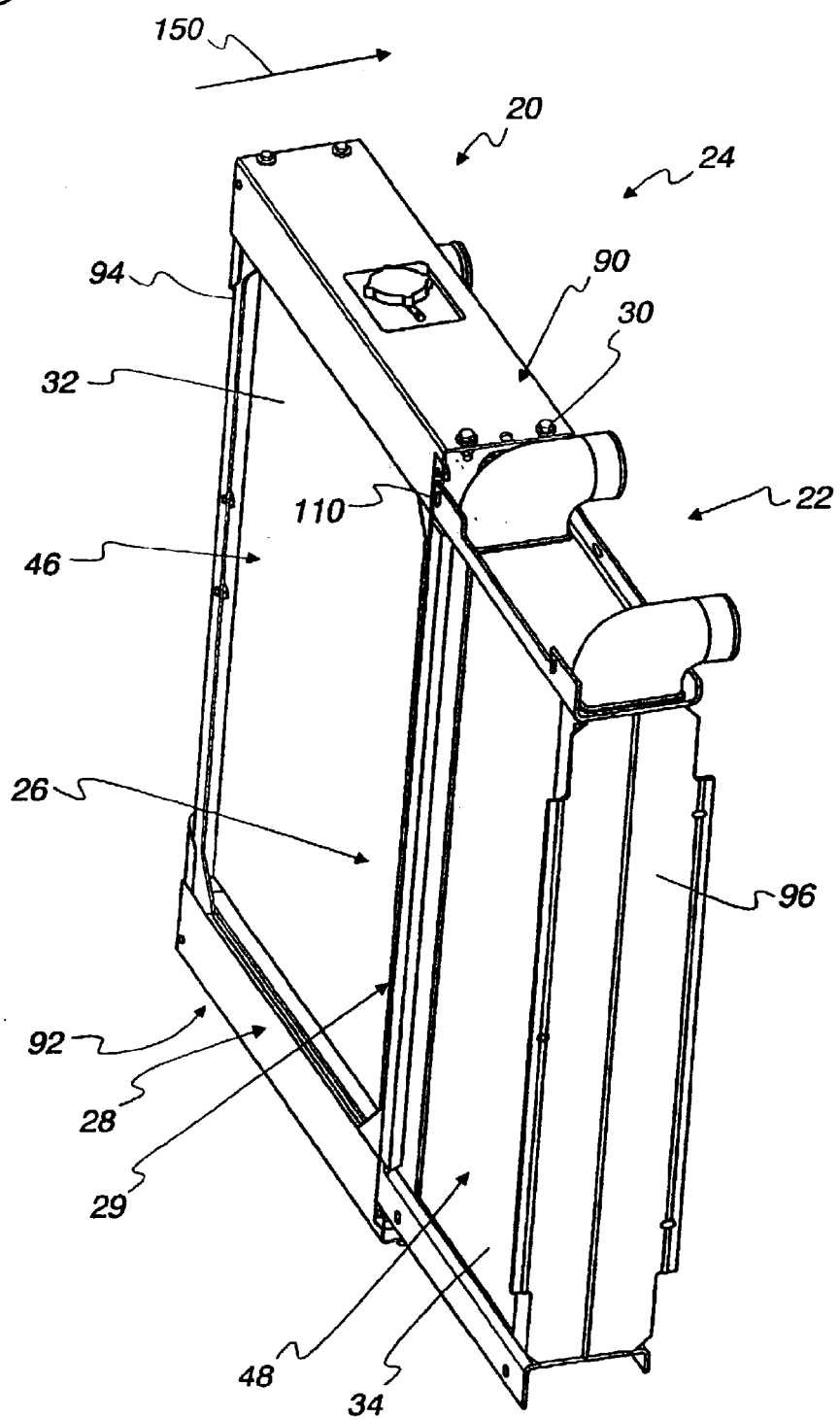
FIG. 2 is a perspective view of the subassembly.
Figure 5:
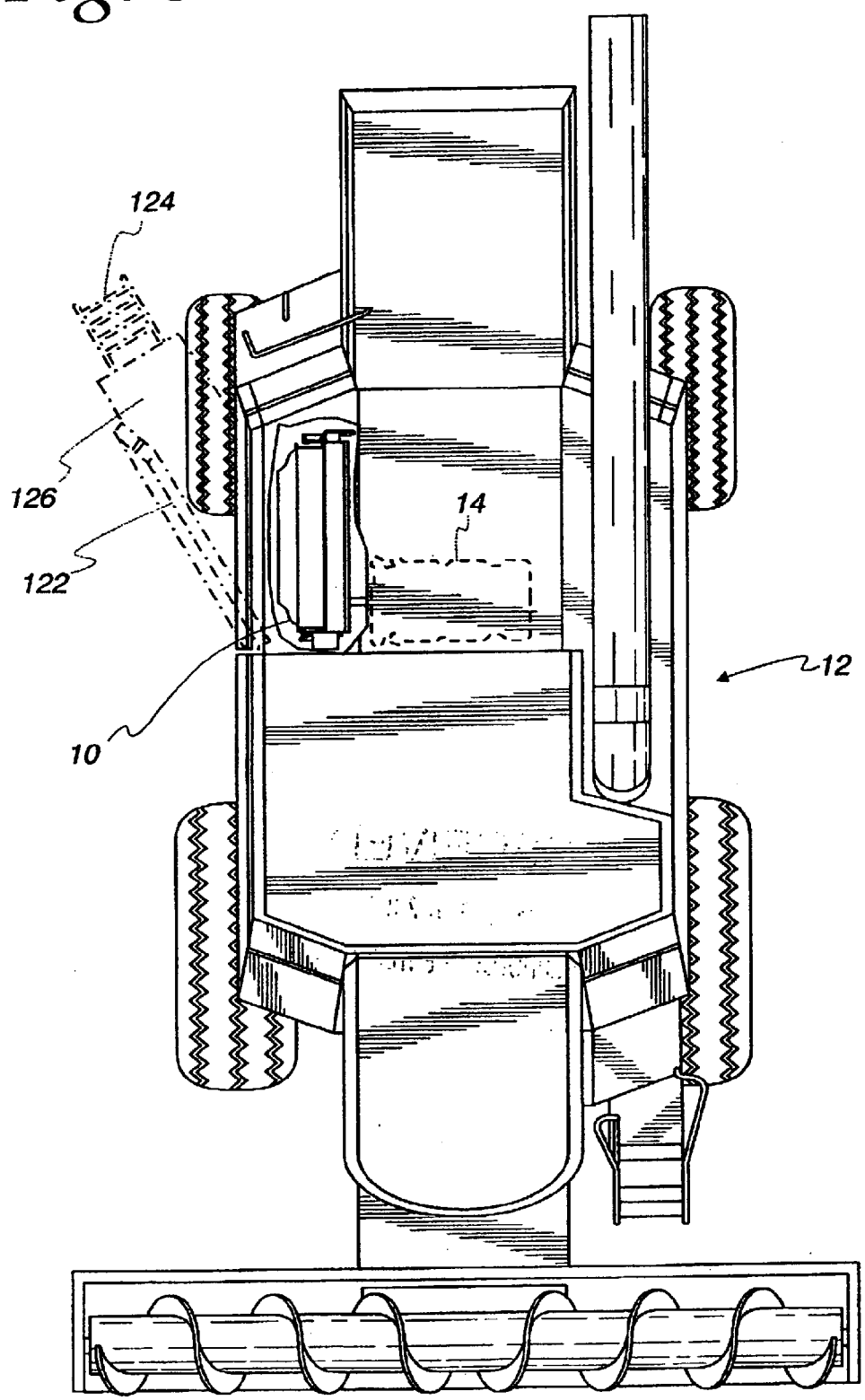
FIG. 5 is a view of the combine, with a cutaway view of the positioning of the cooling package.

Referring now to the figures, there is shown a novel and improved cooling package 10 for use in an agricultural combine 12. The inventive cooling package advantageously incorporates both a radiator 20 and a charge air cooler 22, which are combined into a unitary subassembly 24 having a face 26 with a perimeter 28, as part of the manufacturing process, in order to create a metal-to-metal seal 29 between the subassembly components of radiator 20 and charge air cooler 22 and thereby prevent undesirable leakage of air in the juncture 30 between the cooling cores 32 and 34. Moreover, the cooling package advantageously mounts the subassembly in a frame 40 having a sealing flange 42, thereby preventing leakage of air around the perimeter of the subassembly face.

Subassembly 24 is made up of a radiator 20 and a charge air cooler 22. Radiator 20 uses a cooling fluid, such as a mixture of water and ethylene glycol, to cool engine 14. The cooling fluid collects heat from engine 14 and then runs back to radiator 20 where it runs through the fins or other heat exchanger surfaces of heat exchanger core 32 of radiator 20. Charge air cooler 22 cools air compressed in a turbocharger (not shown). Because cooler air is more dense than warm air, cooler air exiting charge air cooler 22, will be able to provide a higher air to fuel ratio to cylinders (not shown) in engine 14 of combine 12 by cooling air exiting a turbocharger, at about 250° C. down to about 80° C. Air from the environment is drawn in a direction of air flow 150 by a fan (not shown) which is housed within shroud 44. The air is drawn through upstream face 46 of radiator 20 and upstream face 48 of charge air cooler 22, where it comes into contact with heat exchanger cores 32 and 34. The environmental air becomes hotter, while the cooling fluid in radiator 20 and the compressed air in charge air cooler 22 become cooler.

Radiator 20 has an upstream face 46, a downstream face 50, a top 52, a bottom 54, and sides 56 and 58. Widths of radiator 20 range from about 60 cm to about 75 cm, with a preferred range of about 65 cm to about 70 cm, and a still more preferred width of about 66 cm. Heights of radiator 20 range from about 95 cm to about 120 cm, with a preferred range of about 105 cm to about 115 cm and still more preferred height of about 107 cm. Thicknesses of radiator 20 range from about 10 cm to about 20 cm, with a preferred range of about 15 cm to about 18 cm, and still more preferred a thickness of about 17.5 cm.

Charge air cooler 22 has an upstream face 48, a downstream face 60, a top 62, a bottom 64, and sides 66 and 68. Widths of charge air cooler 22 range from about 40 cm to about 50 cm, with a preferred range of about 45 cm to about 48 cm, and a still more preferred width of about 46 cm. Heights of charge air cooler 22 range from about 85 cm to about 110 cm, with a preferred range of about 90 cm to about 95 cm and still more preferred height of about 93.5 cm. Thicknesses of charge air cooler 22 range from about 10 cm to about 20 cm, with a preferred range of about 15 cm to about 18 cm, and still more preferred a thickness of about 16 cm. It is also preferred that the height and thickness of charge air cooler 22 be the generally the same as the height and width of radiator 20 so that when they are combined, they form a subassembly 24, preferably of a uniform height and thickness with a width that is the combined width of radiator 20 and charge air cooler 22. It is also preferred that upstream faces 46 and 48 also line up to form a substantially continuous upstream face 26 of the subassembly 24.

Side 56 of radiator 20 and side 66 of charge air cooler 22 are connected to form subassembly 24 having an upstream face 26 with a perimeter 28. The connection of radiator 20 and charge air cooler 22 forms subassembly seal 29 between radiator 20 and charge air cooler 22. Subassembly seal 29 eliminates leak paths at juncture 30 between radiator 20 and charge air cooler 22. An advantage of creating subassembly 24 with subassembly seal 29 is that it improves cooling efficiency of cooling package 10. By creating the subassembly, it is unnecessary to stuff gaps with irregular foam packing that falls out and looks unsightly, which also reduces maintenance requirements. Subassembly 24 also reduces the overall size of cooling package 10, which saves on manufacturing costs, and saves precious space within the combine.

In a preferred construction of the subassembly, the radiator and the charge air cooler are provided with lips to be bolted together. Thus, radiator 20 has upstream lips 70 and downstream lips 72 that extend upstream and downstream from side 56 of radiator 20 and charge air cooler 22 has lips 74 and 76 that extend upstream and downstream from side 66 of charge air cooler 22. Lips 70 and 72 of radiator 20 and lips 74 and 76 of charge air cooler 22 have a length of about 50% to about 80% of the height of radiator 20 and charge air cooler 22, with a preferred range of about 60% to about 70%, and still more preferred length of about 65% of the height of radiator 20. Lips 70 and 72 of radiator 20 and lips 74 and 76 of charge air cooler 22 have a width of between 1 cm and 4 cm, with a preferred range of 1.5 cm to 2.5 cm, and still more preferred a width of about 2 cm. It is preferred that the lengths of lips 70 and 72 of radiator 20 and lips 74 and 76 of charge air cooler 22 be approximately the same length and width so that when they can be easily engaged to form subassembly 24. Lips 70 and 72 of radiator 20 have mounting holes 78 and lips 74 and 76 of charge air cooler 22 have mounting holes 80. Each of the lips has one or more mounting holes 78 and 80, with a preferred number of three. Mounting holes 78 and 80 have a preferred diameter of between about 5 mm and about 25 mm, with a preferred range of about 8 mm to about 12 mm, and still more preferred a diameter of about 10 mm. The diameter of mounting bolts 82 and mounting nuts 84 are slightly smaller than the diameter of mounting holes 78 and 80 so that mounting bolts 82 will fit into the mounting holes.

Radiator 20 and charge air cooler 22 are connected by engaging upstream lip 70 of radiator 20 with upstream lip 74 of charge air cooler 22 and downstream lip 72 of radiator 20 and downstream lip 76 in charge air cooler 22 so that holes 78 in radiator lips 70 and 72 are in alignment with holes 80 in charge air cooler lips 74 and 76.

The lips are securely but releasably connected by the use of mounting bolts 82, preferably three bolts. Although it is preferred that bolts are used to connect lip 70 to lip 74 and lip 72 to lip 76, the lips alternatively could be welded together to create a secure connection and seal between radiator 20 and charge air cooler 22. Bolts 82 are passed through mounting holes 78 and 80 and engaged with nuts 84 to form a seal between radiator 20 and charge air cooler 22, which forms subassembly 24, having upstream face 26 with perimeter 28, downstream face 86 with perimeter 88, top 90, bottom 92, and sides 94 and 96. The preferred construction allows easy connection between radiator 20 and charge air cooler 22 because it only requires the installation of one or more nuts and bolts, with the preferred number of nuts and bolts being three each. The embodiment also ensures a tight metal to metal seal between side 56 of radiator 20 and side 66 of charge air cooler 22 simply by tightening bolts 82.

Cooling package 10 is comprised of subassembly 24 as it is previously described, and an outer frame 40. Subassembly 24 is placed within frame 40 to provide a rigid structure for cooling package 10 and one unit to be placed in combine 12.

Frame 40 is made up of outer walls 98, each having an inner surface 100. Walls 98 define an opening 102 within frame 40 into which subassembly 24 can be placed. The dimensions of frame 40 depend on the sizes of radiator 20 and charge air cooler 22 that make up subassembly 24. For example, the inside width of frame 40 would be approximately the same as the width of subassembly 20, allowing enough tolerance for subassembly 24 to fit inside frame 40. The inside height of frame 40 would be slightly larger than the height of subassembly 24 to create gaps 104 between walls 98 and subassembly 24. Gaps 104 are intended to allow the feed and withdrawal of cooling fluid from radiator 20 and air from charge air cooler 22. The width of each wall 98 of frame 40, which corresponds to the thickness of frame 40, is between about 120 cm and about 150 cm, with a preferred range of about 130 cm to about 140 cm, and a still more preferred width of about 135 cm. Attached to inner surfaces 100 of frame 40 is a flange 42. It is preferred that flange 42 be continuously connected to the entirety of inner surface 100, but it is conceivable to place the flange on three or fewer of inner surfaces 100 of walls 98. Range 42 has a width of between 2 and 5 cm, with a preferred range of 2.5 to 3.5 cm, and still more preferred width of about 3 cm. It is the purpose of flange 42 to create a mounting surface for subassembly 24 and to create a perimeter seal 108 around the perimeter 28 of subassembly 24.

Subassembly 24 is mounted within opening 102 of frame 40. Perimeter 28 of upstream face 26 of subassembly 24 is abutted against flange 42 to form perimeter seal 108. Perimeter 28 of upstream subassembly face 26 also has holes 110 to allow the mounting of subassembly 24 to flange 42 of frame 40. Subassembly 24 is mounted to frame 40 by placing a set of bolts 112 though mounting holes 114 in flange 42 and through subassembly mounting holes 110 in perimeter 28 of subassembly face 26. Perimeter seal 108 eliminates leak paths around perimeter 28 of upstream subassembly face 26. The combination of subassembly seal 29 and perimeter seal 108 directs the cooling air through radiator core 32 and charge air cooler core 34, and prevents the formation of leak paths around cores 32 and 34.

Although a metal to metal seal can be formed around perimeter 28 of upstream subassembly face 26, it is preferable to place foam 116 onto flange 42 so that foam 116 is between perimeter 28 and flange 42 in order to ensure a good and effective seal between the perimeter of upstream subassembly face 26 and flange 42. Preferably, foam 116 has adhesive on one side to allow attachment to flange 42. Foam 116 has a width slightly smaller than the width of flange 42, with a width between 1.5 cm and 4.5 cm, with a preferred range of 2 to 3 cm, and a still more preferred width of about 2.5 cm. The thickness of foam 116 can range from 1 mm to 10 mm, with a preferred range of 2 mm to 5 mm, and a still more preferred thickness of about 3.3 mm. Alternatively, another material, such as rubber, or m another configuration, such as a continuous gasket can be used to ensure perimeter seal 108. The preferred embodiment uses strips of foam, which can be purchased in rolls from suppliers and applied as desired. The method is advantageous because it allows the foam to be placed on several different sizes of cooling packages, while still providing an effective seal about the perimeter of the subassembly. The use of foam, however, is optional and may be eliminated if one desires a metal to metal seal 117 between subassembly 24 and flange 42.

Subassembly 24 is placed within opening 102 in frame 40 and engages foam 116 attached to downstream surface 124 of flange 42. Foam 116 ensures subassembly 24 forms perimeter seal 108 by compensating for variations in manufacturing and for loosening or shifting of components in the field. Although it is preferred that perimeter 28 of upstream subassembly face 26 is mounted to downstream surface 124 of flange 42, it is possible to mount perimeter 88 of downstream subassembly face 86 to upstream surface 118 of flange 42 within the scope of the present invention.

Because of the extremely dirty environment of an agricultural combine, upstream face 26 of subassembly 24 becomes covered with dust and chaff, and if face 26 is not cleared regularly, heat exchanger cores 32 and 34 can become blocked off. To aid in clearing of face 26, passive fan blades 120 are placed directly upstream from face 26 to increase turbulence of air drawn through cooling package 10. A detailed description of passive fan blades 120 is disclosed in co-pending application with the application Ser. No. 10/053,515, filed on Oct. 25, 2001, incorporated by reference as if reproduced in full herewith.

A conventional fan (not shown), housed downstream of cooling package 10 within shroud 44, draws air through cooling package 10 in air flow direction 150 and spins at a rotational speed of about 1500 rpm up to about 2000 rpm. An optional hydrostatic/hydraulic oil cooler (not shown) is a heat exchanger that can be placed upstream of cooling package 10. The oil cooler cools engine oil to extend service life of engine 14. A rotary screen door (not shown) is placed upstream of the oil cooler to act as a filter of larger pieces of chaff. The rotary screen has a positive, full time drive that rotates whenever engine 14 is running. The rotary screen acts as a filter for larger pieces of chaff and has a vacuum pickup to clear this chaff from the screen door. The fan, hydrostatic/hydraulic oil cooler and the rotary screen door all have functions in combine 12 related to cooling package 10, but are not a part of the scope of the present invention.

Air follows a path in the direction of air flow 150, and flows through the rotary screen door, through a heat exchanger core of the hydrostatic/hydraulic oil cooler. The air passes passive fan blades 120, the flow of air causing fan blades 120 to rotate, increasing turbulence of the air and helping to clean chaff and dust off upstream subassembly face 26. The air passes through heat exchanger core 32 of radiator 20 and heat exchanger core 34 of charge air cooler 22 where the air becomes heated. The air passes out of cores 32 and 34 out of downstream subassembly face 86 into shroud 44, where it is drawn by the fan.

In order to allow easy clearing of dust and chaff off of cooling package 10, a hinged access door 122 is placed on an outside wall of combine 12. Ladder 124 and landing 126 are placed up against the outer wall and door 122 is opened giving access to the rotary screen door, which is also hinged and can be swung out to allow access to the hydrostatic/hydraulic oil cooler. The hydrostatic/hydraulic oil cooler also is hinged to allow access to cooling package 10 so that upstream subassembly face 26 may be cleaned by an operator of combine 12.

Cooling package 10 may be manufactured by the following method. The desired dimensions of cooling package 10 are chosen, and frame 40 is manufactured to these dimensions. Radiator 20 and charge air cooler 22 are selected to fit within opening 102 of frame 40 so that sides 94 and 96 of subassembly 24 have a line to line fit with inner surfaces 100 of walls 98 of frame 40 and so that top 90 and bottom 92 of subassembly 24 have gaps 104 between them. Flange 42 is attached to inner surfaces 100, preferably by welding. Foam 116 is placed onto downstream surface 124 of flange 42 and provides a nearly continuous layer of sealing foam.

Subassembly 24 is assembled by placing both radiator 20 and charge air cooler 22 into a jig (not shown) which aligns radiator 20 and charge air cooler 22. Alternatively, radiator 20 and charge air cooler 22 can be placed on a flat surface and upstream lips 70 and 74 and downstream lips 72 and 76 are aligned. Once radiator 20 and charge air cooler 22 are aligned properly, mounting bolts 82 are passed through mounting holes 78 in lips 70 and 74 and 72 and 76. Mounting nuts 84 are then engaged with mounting bolts 82 and tightened until a line to line fit between radiator 20 and charge air cooler 22 is established, forming subassembly seal 29 between the radiator 20 and charge air cooler 22. Subassembly 24 is then placed within opening 102 of frame 40 so that the perimeter 28 of the subassembly face 26 is abutted against flange 42 so that foam 116 is in contact with both perimeter 28 of upstream subassembly face 23 and flange 42, creating perimeter seal 108. Subassembly 24 is then mounted to flange 42 of frame 40 using frame bolts 112, which pass through flange mounting holes 114 and subassembly mounting holes 110 to form a rigid structure of cooling package 10.

An advantage of the formation of subassembly 24 is that it forms a subassembly seal 29 between radiator 20 and charge air cooler 22. An advantage of flange 42 is that it forms a perimeter seal 108 around perimeter 28 of upstream subassembly face 26. The formation of seals 29 and 108 within cooling package 10 eliminates the need to place irregular pieces of foam packing in gaps between the radiator and charge air cooler, or between radiator 20 and charge air cooler 22 or between these components and the cooling package frame 40. Not only is the time consuming step of applying this foam packing into the gaps eliminated, but the gaps themselves are eliminated. This saves time in the manufacturing process, it saves space in the combine, and it saves on costs of material because the cooling package is of a smaller size than the prior art. But most importantly, the formation of seals 29 and 108 eliminate leaks that bypass heat exchanger cores 32 and 34.

The present invention should not be limited to the above-described embodiments, but should be limited solely by the following claims.

What is claimed is:

1. A subassembly for a cooling package for use in an agricultural combine, comprising:
   a radiator having an upstream face;
   a charge air cooler having an upstream face;
   said charge air cooler being bolted to said radiator to form an upstream subassembly face comprising the upstream radiator face and the upstream charge air cooler face, wherein said upstream radiator face is aligned substantially in the same plane with said upstream charge air cooler face, and to form a line to line fit between said radiator and said charge air cooler for a metal to metal seal, and wherein there are no leak paths between the radiator and the charge air cooler.

2. The subassembly of claim 1, wherein the radiator and the charge air cooler have extended lips that are connected by bolting the extended lips together.

3. A subassembly according to claim 1, wherein the radiator has a side and the charge air cooler has a side, wherein the side of the radiator is bolted to the side of the charge air cooler, and wherein the metal to metal seal is formed between the side of the radiator and the side of the charge air cooler.

4. A cooling package for use in an agricultural combine, comprising:
   a frame having walls that define an opening, each wall having an inner surface;
   a flange attached around the entirety of the inner surfaces of the walls, the flange extending inwardly into the opening;
   a radiator having a face;
   a charge air cooler having a face;
   the radiator being connected to the charge air cooler in order to form a subassembly, the subassembly having a face with a perimeter, said subassembly face comprising the radiator face and the charge air cooler face;
   the subassembly being mounted in the opening of the frame, there being a seal between the perimeter of the subassembly face and the flange, wherein there are no leak paths around the perimeter of the subassembly face.

5. A cooling package according to claim 4, wherein the radiator has a side and the charge air cooler has a side, wherein the side of the radiator is connected to the side of the charge air cooler.

6. The cooling package of claim 5, wherein the sides of the radiator and the charge air cooler have extended lips and the sides are connected by bolting the extended lips together.

7. A cooling package according to claim 4, wherein said radiator is connected to said charge air cooler to form a metal to metal seal between said radiator and said charge air cooler so that there are no leak paths between the radiator and the charge air cooler.

8. A cooling package for use in an agricultural combine, comprising:
   a frame having walls that define an opening, each wall having an inner surface;
   a flange attached to the inner surfaces of the walls, the flange extending inwardly into the opening;
   a radiator having a face;
   a charge air cooler having a face;
   the radiator being connected to the charge air cooler in order to form a subassembly, the subassembly having a face with a perimeter, said subassembly face comprising the radiator face and the charge air cooler face;
   the subassembly being mounted in the opening of the frame, there being a seal between the perimeter of the subassembly face and the flange, wherein there are no leak paths around the perimeter of the subassembly face;
   wherein the seal between the perimeter of the face of the subassembly and the flange comprises foam between the perimeter of the subassembly face and the flange.

9. A method of manufacturing a cooling package for use in an agricultural combine, comprising the steps of:
   providing a frame having walls that define an opening, each wall having an inner surface;

attaching a flange around the entirety of the inner surfaces of the walls so that the flange extends inwardly into the opening;

providing a radiator having a face;

providing a charge air cooler having a face;

connecting the radiator to the charge air cooler to form a subassembly with a face having a perimeter, said subassembly face comprising the radiator face and the charge air cooler face;

mounting the subassembly into the opening of the frame; and sealing the perimeter of the subassembly face against the flange so that there are no leak paths around the perimeter of the subassembly face.

10. The method of claim 9, wherein the step of connecting the radiator to the charge air cooler is done with nuts and bolts.

11. A method according to claim 9, wherein said radiator has a side and said charge air cooler has a side, wherein said connecting step comprises connecting the side of the radiator to the side of the charge air cooler.

12. A method according to claim 9, further comprising the step of forming a metal to metal seal between the radiator and the charge air cooler so that there are no leak paths between the radiator and the charge air cooler.

13. A method of manufacturing a cooling package for use in an agricultural combine, comprising the steps of:

providing a frame having walls that define an opening, each wall having an inner surface;

attaching a flange to the inner surfaces of the walls so that the flange extends inwardly into the opening;

providing a radiator having a face;

providing a charge air cooler having a face;

connecting the radiator to the charge air cooler to form a subassembly with a face having a perimeter, said subassembly face comprising the radiator face and the charge air cooler face;

mounting the subassembly into the opening of the frame;

attaching foam to the flange in order to ensure a positive seal between the perimeter of the subassembly face and the flange; and sealing the perimeter of the subassembly face against the flange so that there are no leak paths around the perimeter of the subassembly face.

14. A cooling package for use in an agricultural combine, comprising:

a frame having walls that define an opening, each wall having an inner surface;

a flange attached to the inner surfaces of the walls, the flange extending inwardly into the opening;

a radiator having a face;

a charge air cooler having a face;

the radiator being connected to the charge air cooler in order to form a subassembly, the subassembly having a face with a perimeter, said subassembly face comprising the radiator face and the charge air cooler face;

the subassembly being mounted in the opening of the frame, there being a seal between the perimeter of the subassembly face and the flange, wherein there are no leak paths around the perimeter of the subassembly face;

wherein the seal between the perimeter of the face of the subassembly and the flange is a metal to metal seal.

* * * * *